United States Patent
Chow et al.

[15] 3,691,390
[45] Sept. 12, 1972

[54] COMPOSITE LIGHT SOURCE

[72] Inventors: Ken-Tang Chow, Portola Valley; John William Stull, Livermore; Charles Edward Bates, Campbell, all of Calif.

[73] Assignee: Electric-Nuclear Laboratories, Inc., Menlo Park, Calif.

[22] Filed: Oct. 10, 1969

[21] Appl. No.: 865,461

[52] U.S. Cl............250/217 SS, 313/108 D, 331/94.5
[51] Int. Cl.................................................G02f 1/28
[58] Field of Search.......250/84, 213 A, 217 SS, 220; 331/94.5; 313/108 D; 307/311; 315/169; 317/235 N; 240/41.25

[56] References Cited

UNITED STATES PATENTS

| | | |
|---|---|---|
| 3,310,753 | 3/1967 | Burkhalter.................331/94.5 |
| 3,311,844 | 3/1967 | Di Curcio..................331/94.5 |
| 3,395,368 | 7/1968 | Koester.....................331/94.5 |
| 3,484,716 | 12/1969 | Fenner......................331/94.5 |
| 3,361,988 | 1/1968 | Chynoweth...............331/94.5 |
| 3,521,189 | 7/1970 | Koenig.....................331/94.5 |
| 3,396,344 | 8/1968 | Broom...................317/235 N |
| 3,541,468 | 11/1970 | Hammond................331/94.5 |
| 3,590,248 | 6/1971 | Chatterton...............331/94.5 |

*Primary Examiner*—Walter Stolwein
*Assistant Examiner*—D. C. Nelms
*Attorney*—Eckhoff and Hoppe

[57] ABSTRACT

Each of an array of "$n$" number of similar light sources is repetitively energized in sequence to stimulate emission of light energy therefrom into an optical system which sums the output of the individual devices and forms a composite output into a single beam having a frequency that is "$n$" times the frequency of each individual light source.

10 Claims, 8 Drawing Figures

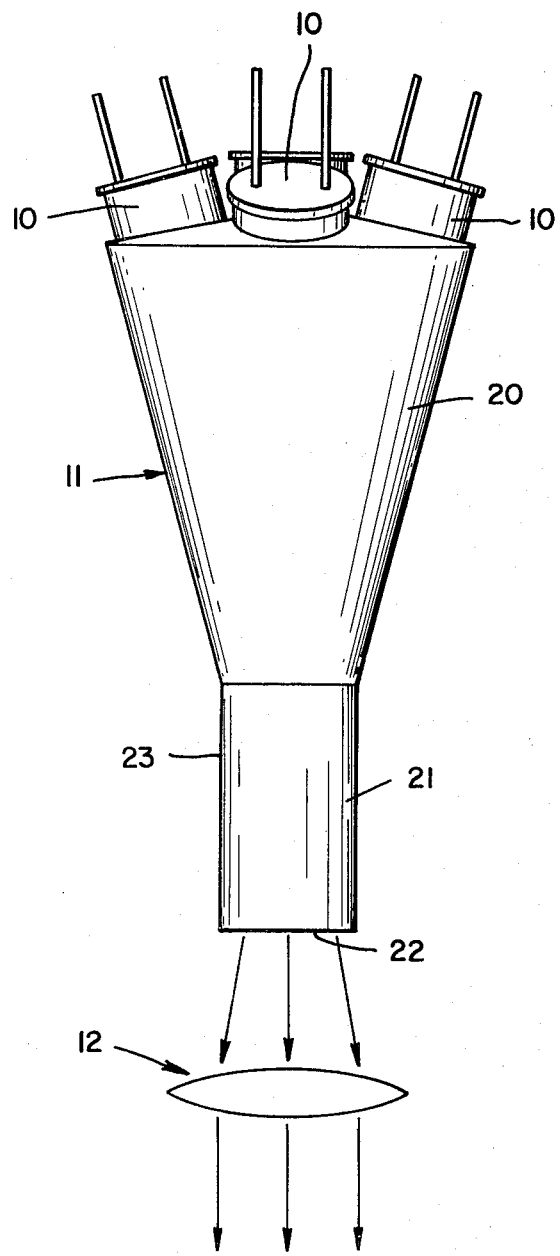
FIG_1
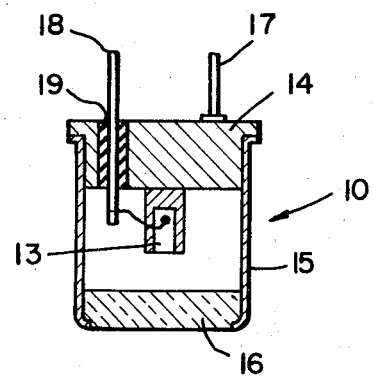
FIG_2

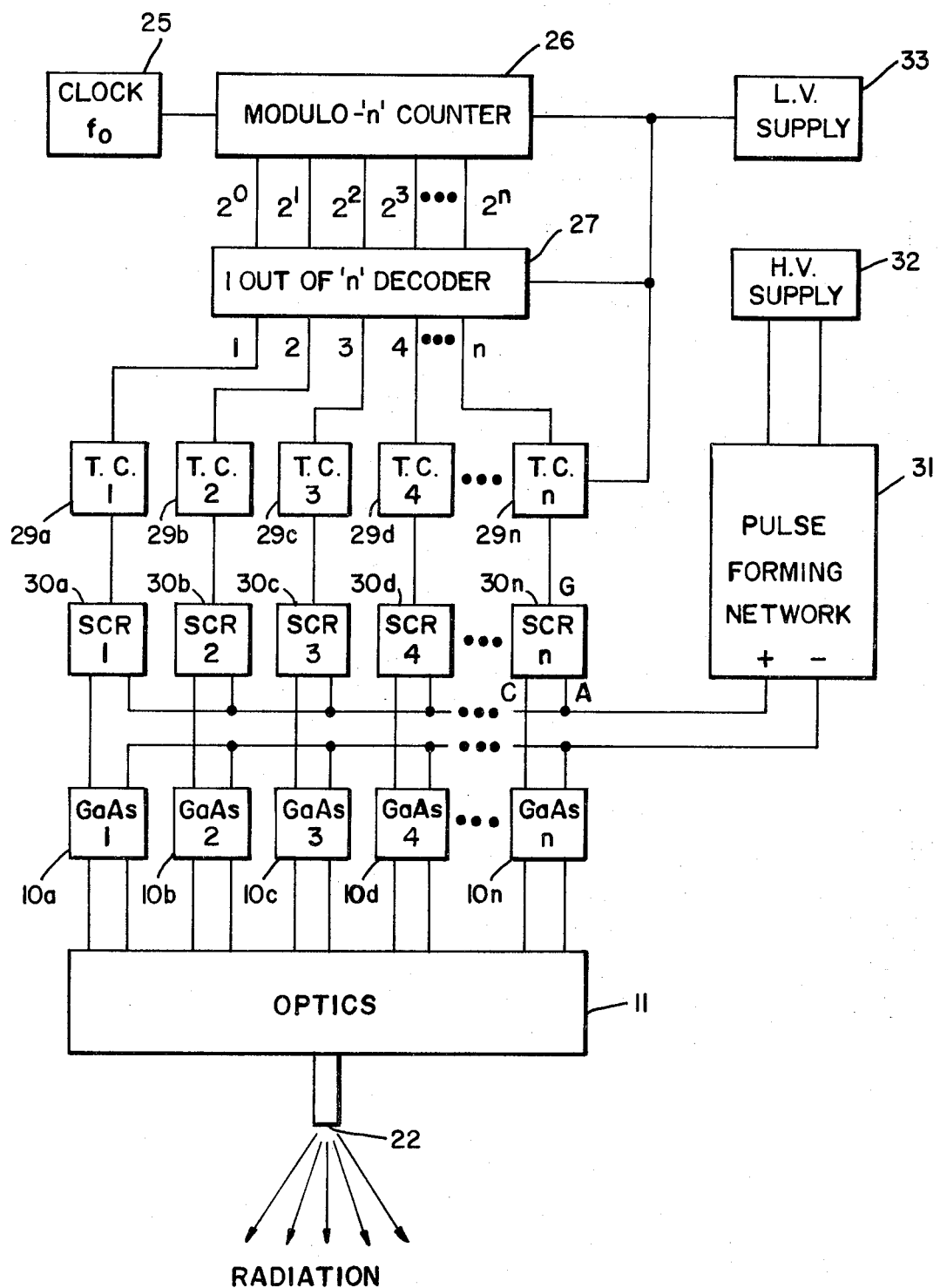
FIG_3

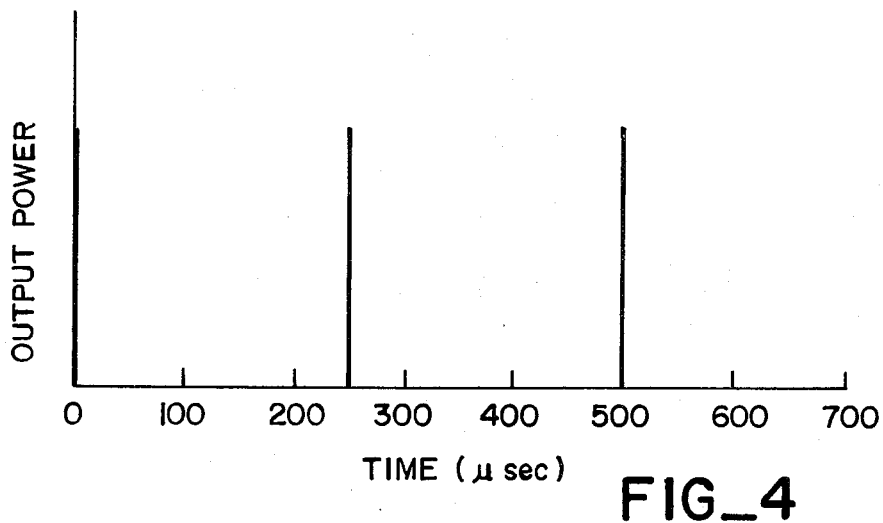
FIG_4
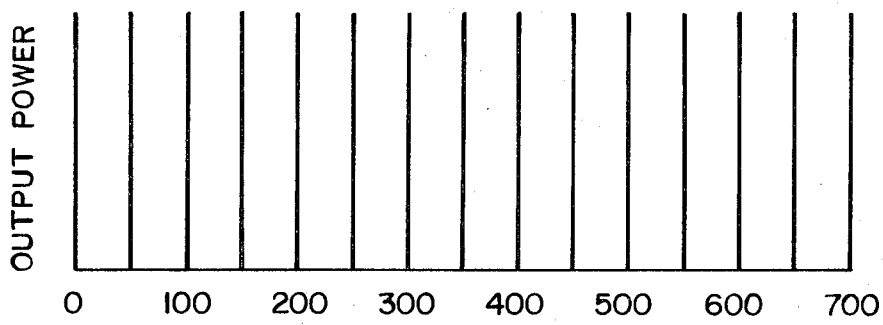
FIG_5
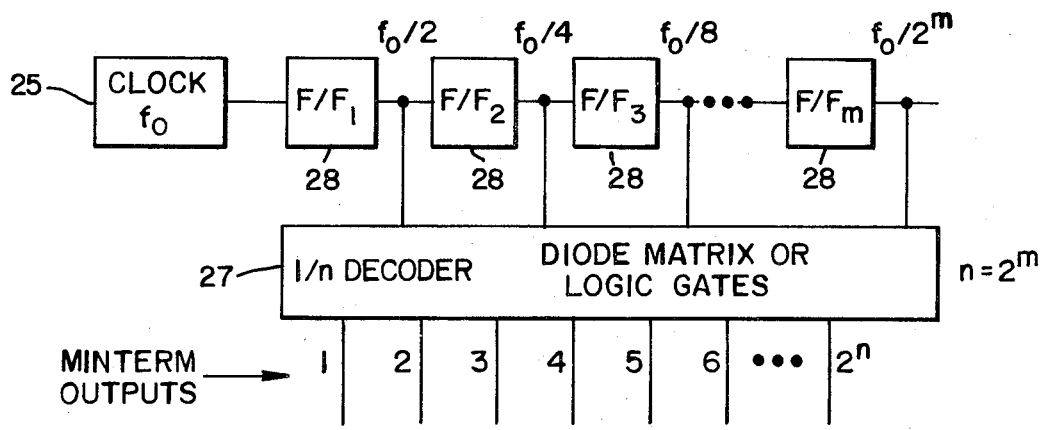
FIG_6

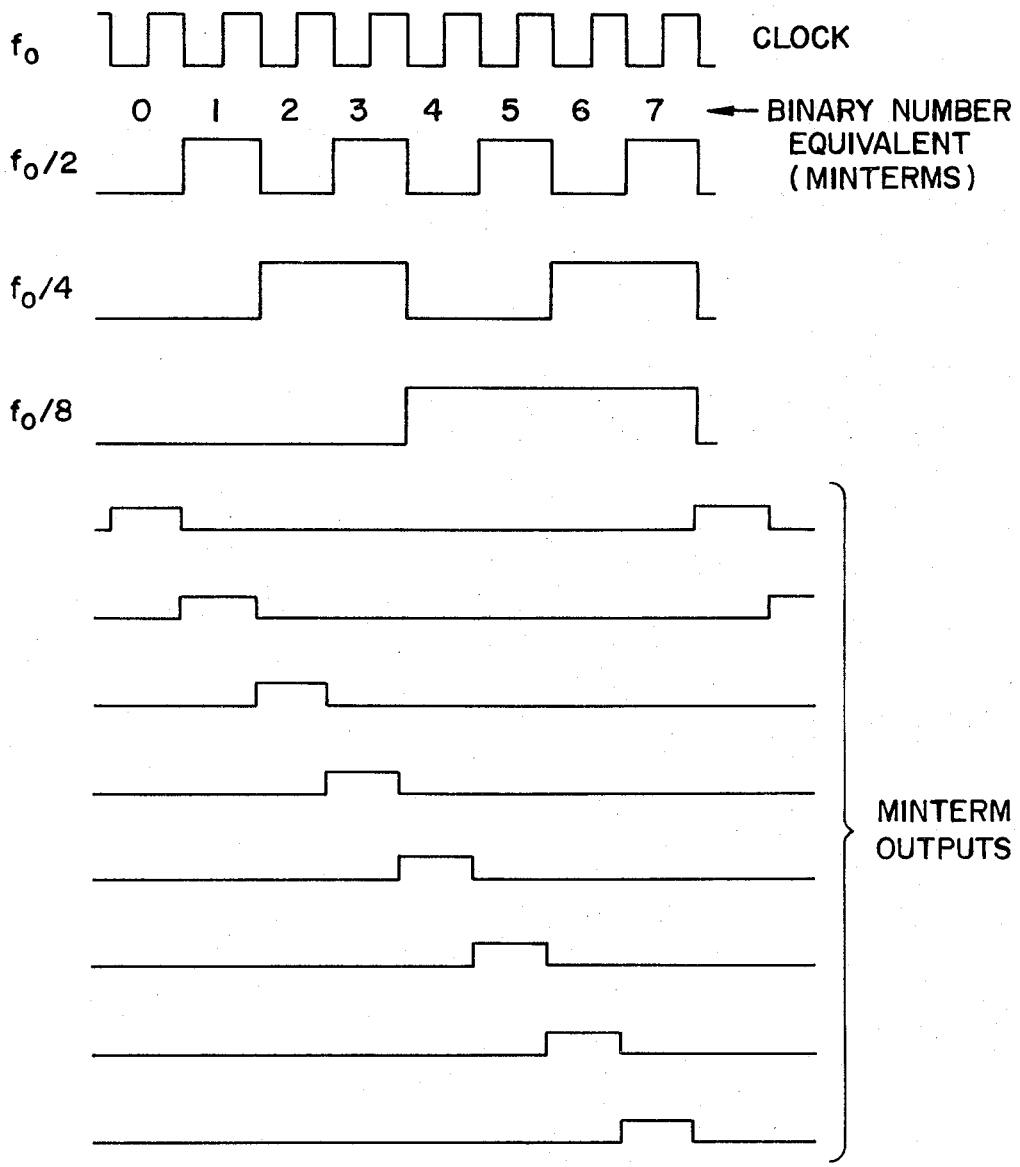
FIG_7

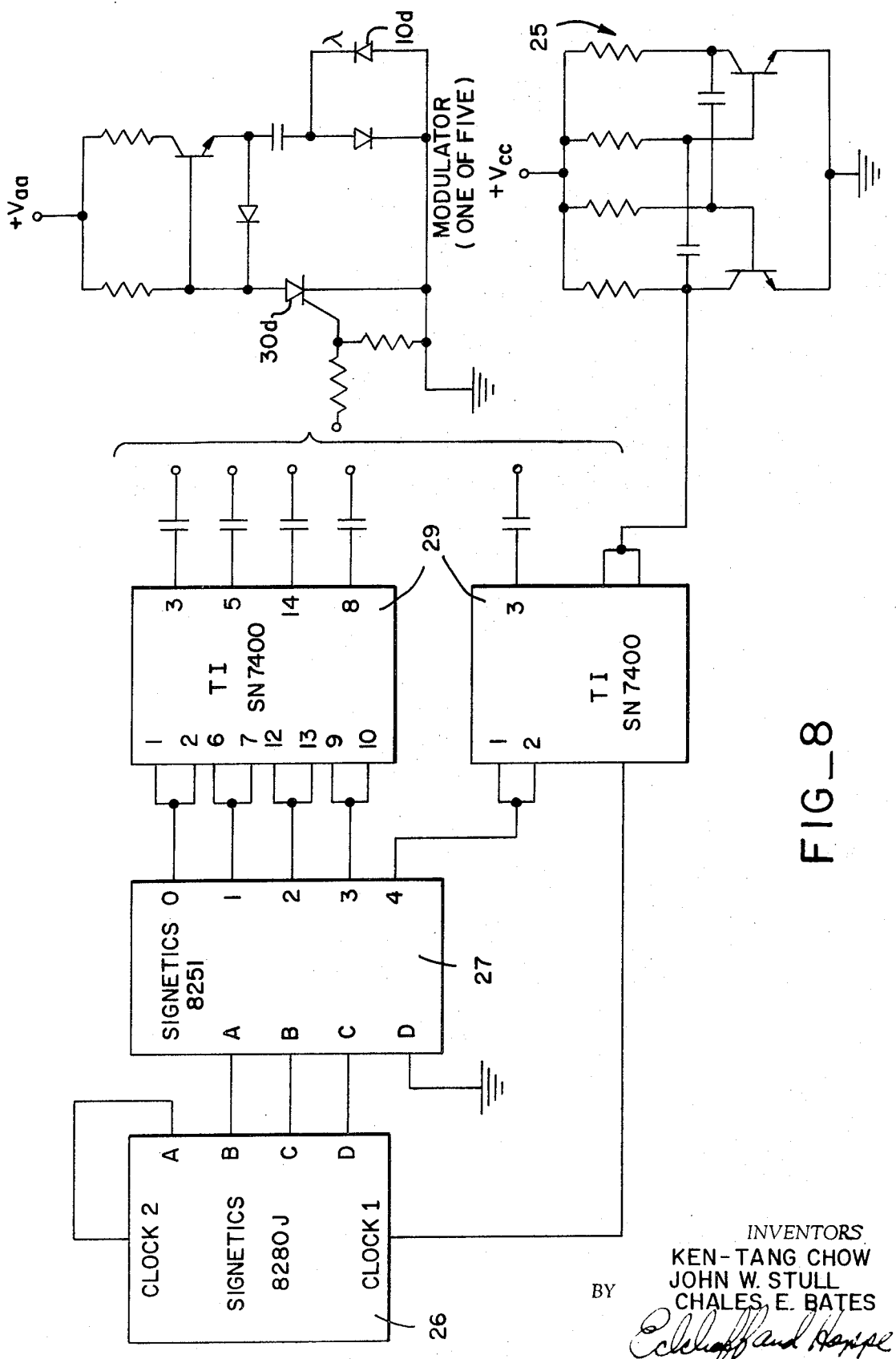
FIG_8

COMPOSITE LIGHT SOURCE

This invention relates generally to light-emitting devices and more particularly to a time-multiplexed array of light-emitting devices which produces a composite radiant output having a frequency that is a multiple of the frequency of each individual device in the array.

The principle object of this invention is to provide a method and means for obtaining a composite light beam which has a frequency and power that is a multiple of the individual outputs of an array of periodically energized light-emitting devices.

A particular object of this invention is to provide a method and means for obtaining a beam of light from an array of semiconductor light-emitting devices at normal ambient temperature which is greater by several orders of magnitude in frequency and power than that heretofore obtainable from one such device alone or connected in series or parallel with similar devices.

A further object of this invention is to provide a method and means for obtaining such increase in frequency and power output, without the necessity for external cooling, from two or more gallium arsenide crystals periodically forward biased at current densities either above or below the threshold value for lasing action.

Still another object of this invention is to provide a method and means for producing a beam of coherent light from two or more gallium arsenide crystals, without external cooling, which has a composite output frequency and power that are multiples of those parameters for each individual crystal.

Still another object of this invention is to provide a method and means for multiplexing an array of injection laser or spontaneous light-emitting diodes.

Other objects and advantages of the invention will become apparent to those skilled in the art upon consideration of the following description and the accompanying drawings wherein FIG. 1 illustrates schematically a form of apparatus embodying this invention which is useful for practicing its method with semiconductor light-emitting sources;

FIG. 2 is a sectional view of one of the individual semiconductor light sources employed in the apparatus of FIG. 1;

FIG. 3 is a functional block diagram of the system of the invention with particular reference to the embodiment of FIG. 1;

FIG. 4 plots the output pulse train of a single one of the semiconductor light sources of the system of FIG. 3;

FIG. 5 illustrates the output pulse train of the system of FIG. 3 using, for example, five semiconductor light sources;

FIG. 6 illustrates schematically a form of multiplexer employed in the embodiment shown in FIG. 3;

FIG. 7 is a diagram of the multiplexing time logic for the embodiment described in FIG. 3; and FIG. 8 is the circuit diagram of a specific embodiment of the invention which employs five gallium arsenide laser diodes.

While the general method of and the apparatus components of the invention are useful with a variety of light sources including tungsten incandescent lamps, neon lamps, mercury or xenon arc lamps, the invention is particularly useful with semiconductor light-emitting devices such as gallium arsenide diodes, and it overcomes a number of limitations inherent in the use of such semiconductor devices as light sources.

It has been known for some time that the passage of large currents through a forward-biased semiconductor p-n junction diode will produce light radiation. It also is known that a gallium arsenide p-n junction diode when biased in the forward injection region by current densities greater than a certain threshold value will emit radiation at room temperature corresponding to about 9,000 angstroms in wavelength which can be made coherent. At current densities below that threshold the radiation is an incoherent spontaneous emission.

The emitted radiation is coherent if (1) the bias current density does exceed the threshold value to produce an inverted population of energy states for lasing action and (2) the crystal, itself, is shaped into an optical resonant cavity. The latter is done by fabricating the two ends of the crystal parallelopiped very perpendicular to the plane of the junction and polishing them to optical flatness. The index of refraction for the air-gallium arsenide surface is high, so it is not necessary to reflectively coat the crystal ends. However, reflective coatings are frequently used to lower the lasing threshold current value. Photons produced by application of forward bias current in excess of the threshold value travel along the path between the reflective ends of the crystal and stimulate other electron-hole pairs to recombine to emit a photon in phase with the stimulating photon. Reflection of the emitted photons back and forth within the resonant cavity produces a standing wave. Since the crystal ends are only partially reflective, some of that wave is emitted as a beam of coherent light along the plane of the junction with a narrow spectral bandwidth.

Gallium arsenide diodes do, however, have very serious limitations when operated at current densities which will produce coherent light emission. Recombination of electrons and holes in the lasing action creates instantaneous localized heating within the semiconductive material itself so that safe operating currents are generally no more than about three times the threshold value. Moreover, other heating effects cause the lasing threshold current value to increase and the output radiant power at a given value above threshold to decrease with a rise in temperature. Accordingly, a useful duty cycle for operation without external cooling and with a current of three times threshold, limits the output frequency for practical applications to about 4 KHz.

The present invention overcomes the limitations caused by these heating effects by combining the radiation output of an array of individual gallium arsenide diodes repetitively energized in sequence to obtain a relatively high power and high frequency output, for instance, as described in the example in the order of 50 KHz.

The embodiment illustrated in FIG. 1 includes a plurality of injection laser diodes 10 arranged in an array directed to emit radiation into a light pipe 11 in which the radiation emitted from the several diodes is mixed and then transmitted to an optical lens system, designated generally as 12, that forms the composite radiation into a beam with the desired optical field.

Each injection laser diode 10, as is shown in FIG. 2, includes a gallium arsenide crystal 13 formed as a p-n junction. The crystal parallelopiped is an optical resonant cavity and has its two ends made very perpendicular to the plane of the p-n junction and polished to optical flatness so that radiation emitted from the crystal, as shown, is generally in the plane of FIG. 2. The crystal 13 mounts on an electrically conductive base 14 within an envelope which includes non-conductive cylindrical shell portion 15 and radiation (light) transparent portion or window 16 secured within the shell at the end opposite base 14. Electrode 17, integral with the base, connects one electrical contact of the crystal. Electrode 18, insulated from the base by dielectric material 19, connects the other contact to supply bias current to the gallium arsenide p-n junction.

In the illustrated embodiment the light pipe 11 includes a large generally conically shaped collection portion 20 which gathers radiation from the plurality of injection laser diodes 10 mounted at its large end so that they emit radiation through their respective windows generally along the longitudinal axis of the light pipe. A cylindrical portion 21 of the light pipe at the small end of the collection portion 20 transmits the collective radiation from the several diodes to an optical lens shaping system 12. The light pipe emits the collective radiation through output aperture 22 to the lens system.

The light pipe is solid light transmissive material such as quartz or molded plastic. Except for aperture 22, a highly diffuse reflective coating 23 of magnesium oxide or titanium oxide coats all exterior surfaces of the light pipe 11, including the conical collection portion 20 and the cylindrical portion 21. Light energy radiated into the pipe from the several injection laser diodes by repeated reflection from the reflectively coated side walls of the light pipe in passing through the pipe is thoroughly mixed and scrambled before it emerges from the non-coated aperture 22.

FIG. 3 illustrates schematically one form of circuit whereby a plurality of injection laser diodes 10 in an array are time-multiplexed so that their combined output at aperture 22 has a frequency "$n$" times the frequency of that of a single diode, where "$n$" is the number of diodes in the array. The light output from each diode, designated in FIG. 3 as 10a, 10b, 10c, 10d ... 10n, radiates into the light pipe 11 and the output aperture 22 emits the combined radiation to the optical lens system 12 of FIG 1.

The system of FIG. 3 repetitively supplies bias current to each of the injection laser diodes in sequence in short pulses in excess of the threshold value for lasing action in the order of 50 nanoseconds duration, for example. FIG. 4 illustrates the resultant output power for a single one of the diodes. FIG. 5 illustrates the output power for the system of FIG. 3 assuming "$n$" is a total of five diodes, A through E, pulsed in sequence with bias current having the same 50 nanosecond pulse width but separated in time by 250 microseconds. The collective output of the array of diodes thus is the sum of the output of each diode when this output is gathered and optically guided in light pipe 11 to emit over the same optical field. The collective output frequency is a multiple of the number of pulsed diodes in the array or in the example, 5 times the frequency of a single diode. It will be apparent that this technique can be used to achieve practically any output frequency by selection of the number of diodes.

A master clock 25 operating at the output pulse repetition rate of the system, $f_o$, triggers a binary or modulo-"$n$" counter 26 wherein "$n$" is the number of laser diodes to be multiplexed. A $1/n$ decoder 27 detects each state of the counter [0—($n-1$)] or its "minterms" and produces a pulse on one of the "n" output lines of the decoder. FIG. 6 is a more detailed diagram of this part of the system. The modulo-"$n$" counter or binary counter 26 is made up of m number of bi-stable multivibrators 28, where m equals $\log_2 n$. The counter outputs $f_o/2, f_o/4, f_o/8 \ldots f_o/2^m$ are fed into the decoder 27 which may be a diode matrix or series of logic gates that produces a unique output on one of its "$n$" output lines so that only one is active at any given time.

The time relationship between the clock pulses $f_o$, the frequency division produced by the binary counter outputs $f_o/2, f_o/4$, etc., and the sequence of min-term outputs 1 through n of the decoder appear on FIG. 7.

Each of the repetitive output pulses on the "$n$" output lines of decoder 27 operates a corresponding trigger circuit 29a, 29b, 29c, 29d, ... 29n. Each trigger circuit gates on a corresponding silicon controlled rectifier switch 30a, 30b, 30c, 30d, ... 30n. Each switch connects one of the array of laser diodes 10a, 10b, etc. to a pulse forming network 31 that supplies forward bias current at a level in excess of the threshold value for lasing action from high voltage supply 32. Energy for operating each of the laser diodes is stored in the pulse forming network, the impedance of which matches that of the diode in series with a small ballast resistor. The network determines the pulse width and the voltage to which the network is charged by supply 32 determines the amplitude of the pulses.

Power supply 33 drives the binary counter 26, decoder 27 and the several trigger circuits 29a, 29b, etc.

The described system thus produces for an array of injection laser diodes, a composite output radiation which has a frequency that is a multiple (by the number of diodes in the array) of the frequency of each individual diode and an average power which is the same multiple at room temperature without cooling.

The system has been configured to produce at ambient room temperatures an output frequency of 50 KHz using five gallium arsenide laser diodes operated in the circuit shown in FIG. 8. Clock 25 is a multivibrator which supplies pulses at repetition rate $f_o$ to trigger modulo-5 counter 26. It is a Signetics 8280J decade counter connected in the bi-quinary mode. Decoder 27 is an array of logic gates that produces a unique output on one of its five output lines in response to the state of the counter outputs supplied to it. In this embodiment decoder 27 is a Signetics 8251 BCD-to-decimal decoder. The repetitive output pulses on the five decoder output lines pass to the series of two input positive NAND gates 29 here shown as a pair of Texas Instruments Type SN 7400 hex inverter microcircuit elements. Each gate output switches on a silicon controlled rectifier switch, 30d for example, in one of five similar modulator circuits incorporating the laser diodes, 10d for example, and pulse forming network elements.

The foregoing specific embodiment is described for illustrative purposes only. It will be apparent to those skilled in this art that modifications to the structure may be practiced and equivalents substituted for the specific elements described which are within the scope of the invention defined in the following claims.

We claim:

1. A method for multiplying the frequency of the output from a periodically electrically energized light source comprising forming an array of a plurality of similar closely adjacent light sources;

repetitively electrically energizing in sequence each of the light sources in said array;

gathering and optically mixing the light emitted from the several energized light sources; and then optically guiding said light into a composite beam having a common optical field for the light emitted from each light source.

2. The method of claim 1 wherein said light sources are semiconductor light-emitting devices.

3. The method of claim 1 wherein said light sources are forward-biased gallium arsenide p-n junction diodes.

4. The method of claim 1 wherein said light sources are forward-biased gallium arsenide p-n junction diodes periodically energized with bias current in excess of the threshold density requisite for lasing action.

5. Apparatus for multiplying the frequency of the output from a periodically electrically energized light source comprising an array of similar light sources in close spatial relationship;

means for repetitively electrically energizing in sequence each of the light sources in said array;

optical means for gathering and mixing the light emitted from the several energized light sources; and optical means guiding said light into a composite beam having a common optical field for the light emitted from each light source.

6. The apparatus of claim 5 wherein said light sources are semiconductor light-emitting devices.

7. The apparatus of claim 5 wherein said light sources are forward-biased gallium arsenide p-n junction diodes.

8. The apparatus of claim 5 wherein said light sources are forward-biased gallium arsenide p-n junction diodes and wherein said means for energizing the light sources supplies bias current to said diodes in excess of the threshold density requisite for lasing action.

9. The apparatus of claim 5 wherein said means for energizing said light sources includes a supply of bias current, gate means for connecting said supply to one of said light sources at a time, and clock controlled means for enabling said gate means to repetitively connect each light source in sequence to said supply.

10. The apparatus of claim 5 wherein said optical means for gathering and mixing light from the light sources comprises a light transmissive conduit, having a large end gathering radiation emitted from said light sources and a smaller end for emitting the combined light from all of said sources, an optically reflective coating on the exterior surface of said conduit, and a light transparent aperture at the small end of said conduit.

* * * * *

UNITED STATES PATENT OFFICE
CERTIFICATE OF CORRECTION

Patent No. 3,691,390           Dated September 12, 1972

Inventor(s) Ken-Tang Chow; John William Stull; Charles Edward Bates.

It is certified that error appears in the above-identified patent and that said Letters Patent are hereby corrected as shown below:

On cover sheet, change assignee to read:

---        Electro-Nuclear Laboratories, Inc.   ---

Signed and sealed this 11th day of February 1975.

(SEAL)
Attest:

RUTH C. MASON
Attesting Officer

C. MARSHALL DANN
Commissioner of Patents
and Trademarks